(12) United States Patent
Inoue

(10) Patent No.: US 6,848,560 B2
(45) Date of Patent: Feb. 1, 2005

(54) SHIFT LOCK MECHANISM FOR AUTOMATIC-TRANSMISSION OPERATING DEVICE

(75) Inventor: Kyoichi Inoue, Shizuoka (JP)

(73) Assignee: Fuji Kiko Co., Ltd., Kosai (JP)

( * ) Notice: Subject to any disclaimer, the term of this patent is extended or adjusted under 35 U.S.C. 154(b) by 0 days.

(21) Appl. No.: 10/270,169

(22) Filed: Oct. 15, 2002

(65) Prior Publication Data

US 2003/0085098 A1 May 8, 2003

(30) Foreign Application Priority Data

Oct. 15, 2001 (JP) ........................................ 2001-316250
May 27, 2002 (JP) ........................................ 2002-151947

(51) Int. Cl.[7] .............................................. F16H 59/10
(52) U.S. Cl. .................................. 192/220.5; 74/473.25
(58) Field of Search .......................... 192/220.2, 220.3, 192/220.4, 220.5; 74/473.21, 473.23, 473.25, 473.33

(56) References Cited

U.S. PATENT DOCUMENTS

| | | | | |
|---|---|---|---|---|
| 1,307,497 A | * | 6/1919 | Jensen ...................... | 74/473.23 |
| 4,930,609 A | * | 6/1990 | Bois et al. ................ | 192/220.7 |
| 4,966,262 A | * | 10/1990 | Mieczkowski ........... | 192/220.2 |
| 5,018,610 A | * | 5/1991 | Rolinski et al. .......... | 192/220.4 |
| 5,176,231 A | * | 1/1993 | Moody et al. ........... | 192/220.2 |
| 5,402,870 A | * | 4/1995 | Osborn ..................... | 192/220.7 |
| 5,431,267 A | * | 7/1995 | Togano et al. ........... | 74/473.23 |
| 5,456,133 A | * | 10/1995 | Sogo et al. .............. | 192/220.2 |
| 5,494,141 A | * | 2/1996 | Osborn et al. ........... | 74/473.23 |
| 5,566,581 A | * | 10/1996 | Smale et al. ............. | 74/473.22 |
| 5,582,073 A | * | 12/1996 | Takeuchi et al. ......... | 74/473.23 |
| 5,695,029 A |   | 12/1997 | Yokoyama et al. | |
| 5,938,562 A | * | 8/1999 | Withey ..................... | 192/220.3 |
| 6,311,577 B1 | * | 11/2001 | Worner et al. ........... | 74/473.23 |

FOREIGN PATENT DOCUMENTS

| JP | 4-307162 A | 10/1992 |
|---|---|---|
| JP | 7-119813 A | 5/1995 |

* cited by examiner

Primary Examiner—Saul Rodriguez
(74) Attorney, Agent, or Firm—Foley & Lardner LLP

(57) ABSTRACT

A shift lock mechanism for an automatic-transmission operating device includes a base bracket having a side wall with a window hole, a lock member rotatably supported to the outer face of the side wall of the base bracket, a hook formed with the lock member and being able to move into and out of the base bracket through the window hole, and an abutment formed on the shift lever and engaged with the hook in the height direction of the base bracket.

16 Claims, 14 Drawing Sheets

SHIFT LOCK MECHANISM FOR AUTOMATIC-TRANSMISSION OPERATING DEVICE

BACKGROUND OF THE INVENTION

The present invention relates to a shift lock mechanism for automatic-transmission (AT) operating devices which are known as a select lever device or a shift lock device for motor vehicles.

The AT operating devices include a so-called gate AT operating device wherein a shift lever is operable in the longitudinal and cross directions of the motor vehicle. A shift lock mechanism for such operating device is disclosed in JP-A 4-307162.

With the shift lock mechanism disclosed in the reference, however, the mounting position of the shift lock mechanism cannot be set at one side of a base bracket, i.e. a frame or a housing to be fixed to a vehicle-body floor.

SUMMARY OF THE INVENTION

It is, therefore, an object of the present invention is to provide a shift lock mechanism for AT operating devices, which can provide a high degree of flexibility in layout of the mounting position of the shift lock mechanism regardless of the direction of sideward inclination of the shift lever in a gate groove.

The present invention provides generally a shift lock mechanism for an automatic-transmission operating device for a motor vehicle, the device including a shift lever which is operable in longitudinal and cross directions of the vehicle, the shift lever including a main-body portion and a lever portion, the mechanism comprising: a base bracket mounted on a floor of the vehicle, the base bracket including a side wall and a window hole; a lock member rotatably supported to an outer face of the side wall of the base bracket; a hook formed with the lock member, the hook being able to move into and out of the base bracket through the window hole; and an abutment formed on the shift lever, the abutment being engaged with the hook in a height direction of the base bracket.

A main feature of the present invention is to provide a device for an automatic transmission for a motor vehicle, comprising: a shift lever being operable in longitudinal and cross directions of the vehicle, the shift lever including a main-body portion and a lever portion; a base bracket mounted on a floor of the vehicle, the base bracket including a side wall and a window hole; a lock member rotatably supported to an outer face of the side wall of the base bracket; a hook formed with the lock member, the hook being able to move into and out of the base bracket through the window hole; and an abutment formed on the shift lever, the abutment being engaged with the hook in a height direction of the base bracket.

DETAILED DESCRIPTION OF THE INVENTION

Referring to the drawings, a shift lock mechanism for AT operating devices embodying the present invention is described.

Figure 1:
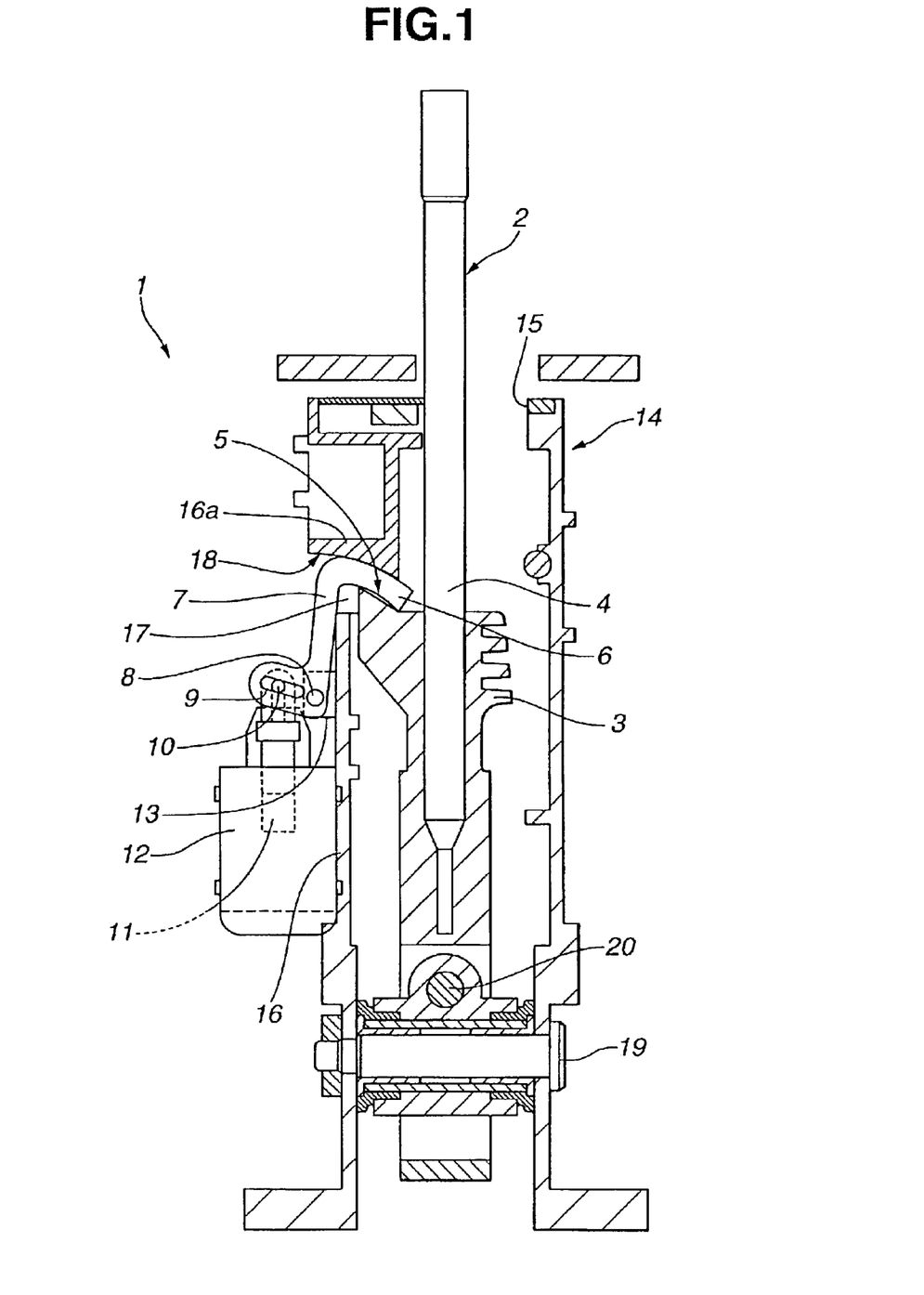
FIG. 1 is a longitudinal sectional view showing a first embodiment of a shift lock mechanism for AT operating devices with shift lock being active.
Figure 2:
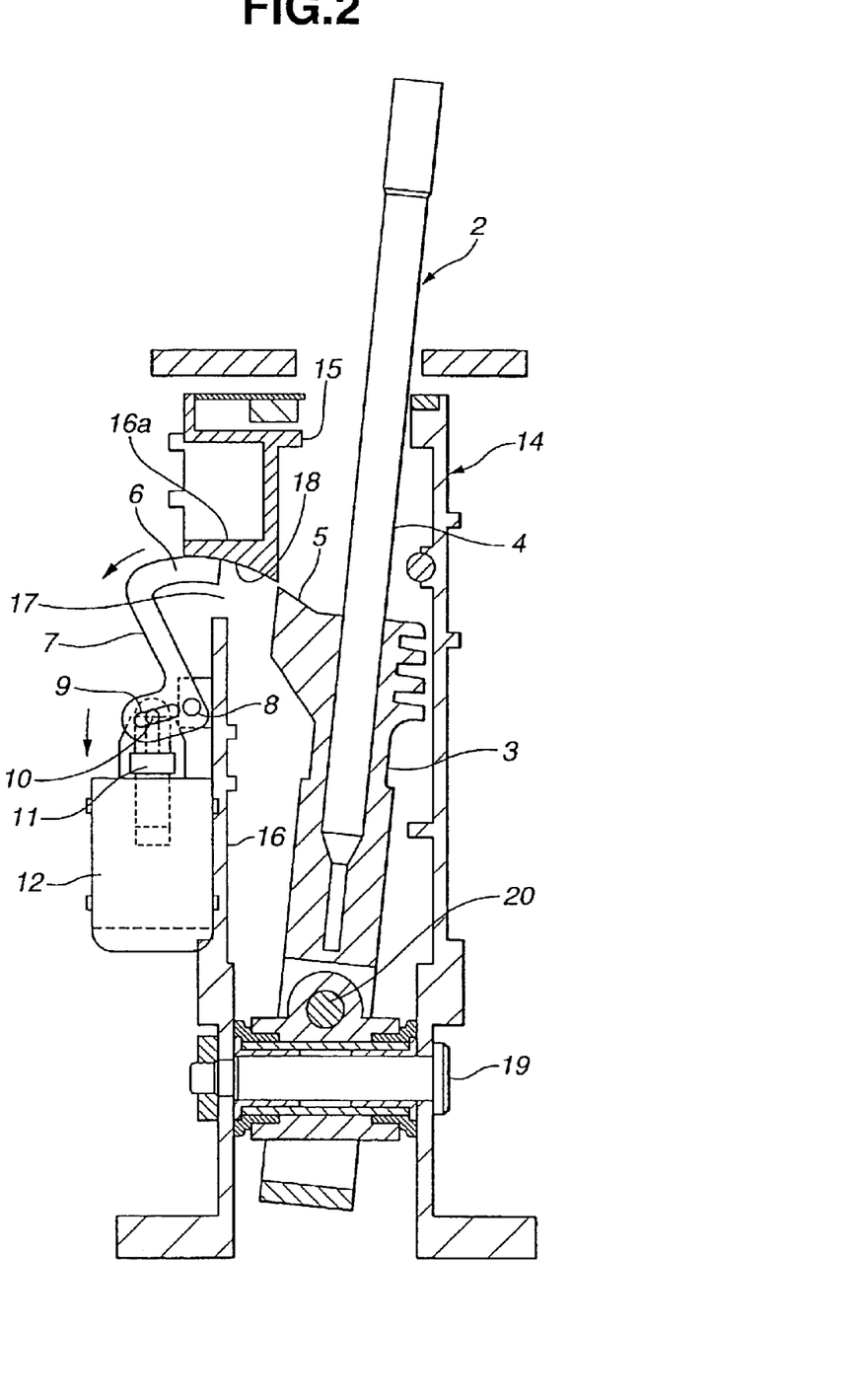
FIG. 2 is a view similar to FIG. 1, showing the first embodiment with shift lock being released.

Referring to FIGS. 1 and 2, there is shown the first embodiment of the present invention. The AT operating device with a shift lock mechanism 1 comprises a base bracket 14 formed like a box and having in the top face a gate groove 15, and a shift lever 2 with a main-body portion 3 and a lever portion 4 accommodated in the base bracket 14 through the gate groove 15 and supported by a shaft 19 to be operable in the longitudinal direction of the motor vehicle and in the cross direction thereof by a shaft 20 integrated with the shaft 19 in the intersectional way. A cable for connecting the shift lever 2 to an automatic transmission, not shown, is coupled to the main-body portion 3 of the shift lever 2 on the front side of the vehicle, whereas a hollow protrusion is integrally formed therewith on the rear side of the vehicle to support through a spring a ball resiliently contacting the corrugated face arranged on the inside of the base bracket 14 to hold the shift lever 2 in a select position.

A window hole 17 is formed in a side wall 16 of the base bracket 14. In order that a lock member 7 which can move into and out of the base bracket 14 through the window hole 17 may rotatably be supported by the outer face of the side wall 16, the lock member 7 includes a shaft 8 rotatably supported by a support 13 of the side wall 16. A hook 6 is formed at a free end of the lock member 7, and has an outer peripheral face formed like a circular arc corresponding to a path of the lock member 7 having a predetermined radius with a rotation fulcrum of the lock member 7, i.e. the shaft 8, as center. In this embodiment, in order to conform to the outer peripheral face of the hook 6, the upper face of the window hole 17 includes a circular face 18 having the same curvature as that of the circular arc of the outer peripheral face of the hook 6. Optionally, the window hole 17 may be a simple opening.

As is desirable to be proportional to the size of the hook 6, the circular face 18 is formed with a receiver 16a obtained by protruding inward the upper portion of the side wall 16. A slot 9 is formed in the lock member 7 at another end, and a plunger 11 is coupled thereto by a pin 10 arranged through the slot 9. The plunger 11 can move into and out of a drive part 12, such as a solenoid, fixed to the outer face of the side wall 16. When the shift lever 2 is in the parking (P) position, and the brake is inactive, the drive part 12 is not actuated, so that the plunger 11 protrudes upward by a resilient force of a spring arranged in the drive part 12.

An abutment 5 is integrally formed with the top face of the main-body portion 3 of the shift lever 2. When the shift lever 2 is shifted to the P position and operated in the cross direction of the vehicle, the hook 6 is rotated and engaged with the abutment 5. In this embodiment, the abutment 5 includes a flat and inclined face opposite to the lower face of the hook 6 and inclined rightward of the vehicle. Optionally, the abutment 5 may include a circular face having the same curvature as that of the lower face of the hook 6, with which the hook 6 can make slide contact.

The abutment 5 only needs to include a face which is inclined downward in the operating direction of the shift lever 2 with respect to a tangent line of a circular arc with the shaft 20 or the center of rotation of the shift lever 2 in the cross direction of the vehicle as center, and is opposite to the circular face 18 at a predetermined distance in the P position. On this account, referring to FIGS. 7 and 8, the hook 6 and the abutment 5 may be formed like a substantially horizontal surface.

When the hook 6 of the lock member 7 enters the window hole 17 between the abutment 5 and the circular hole 18, shift lock is achieved wherein the shift lever 2 is prevented from being moved in the cross direction of the vehicle, i.e. from the P position. When the brake is operated to actuate the drive part 12, the plunger 11 is drawn therein to rotate the lock member 7 outward, so that the hook 6 is disengaged from the window hole 17 between the abutment 5 and the circular hole 18, allowing movement of the shift lever 2 from the P position.

During movement of the shift lever 2 to the P position, the drive part 12 is inactive, so that hook 6 is in the shift lock position. However, the shift lever 2 is moved to the P position in such a way that the side face of the abutment 5 presses a front end of the hook 6. After completion of movement, the lock member 7 is returned to the shift lock position by a resilient force of the spring arranged in the drive part 12.

Since the upper faces of the hook 6 and the window hole 17 include circular faces having the same curvature, the hook 6 in its entirety can always make slide contact with the circular face 18. When a force is produced to move the shift lever 2 rightward of the vehicle, the force is input to the receiver 16a of the base bracket 14 via the hook 6 and the circular face 18, achieving less possibility of breakage of the hook 6, damage of a lock mechanism of the support structures for the shaft 8 and support 13 and the pin 10 and plunger 11, etc., allowing their simple assembling structure.

Referring to FIGS. 3 and 5–8, there is shown the second embodiment of the present invention. In the first embodiment, the shift lock mechanism 1 provides parking lock wherein the shift lever 2 is prevented from being moved from the P position. In the second embodiment, the shift lock mechanism 1 provides not only parking lock, but also neutral lock wherein the shift lever 2 is prevented from being moved from the neutral (N) position to the reverse (R) position.

Figure 3:
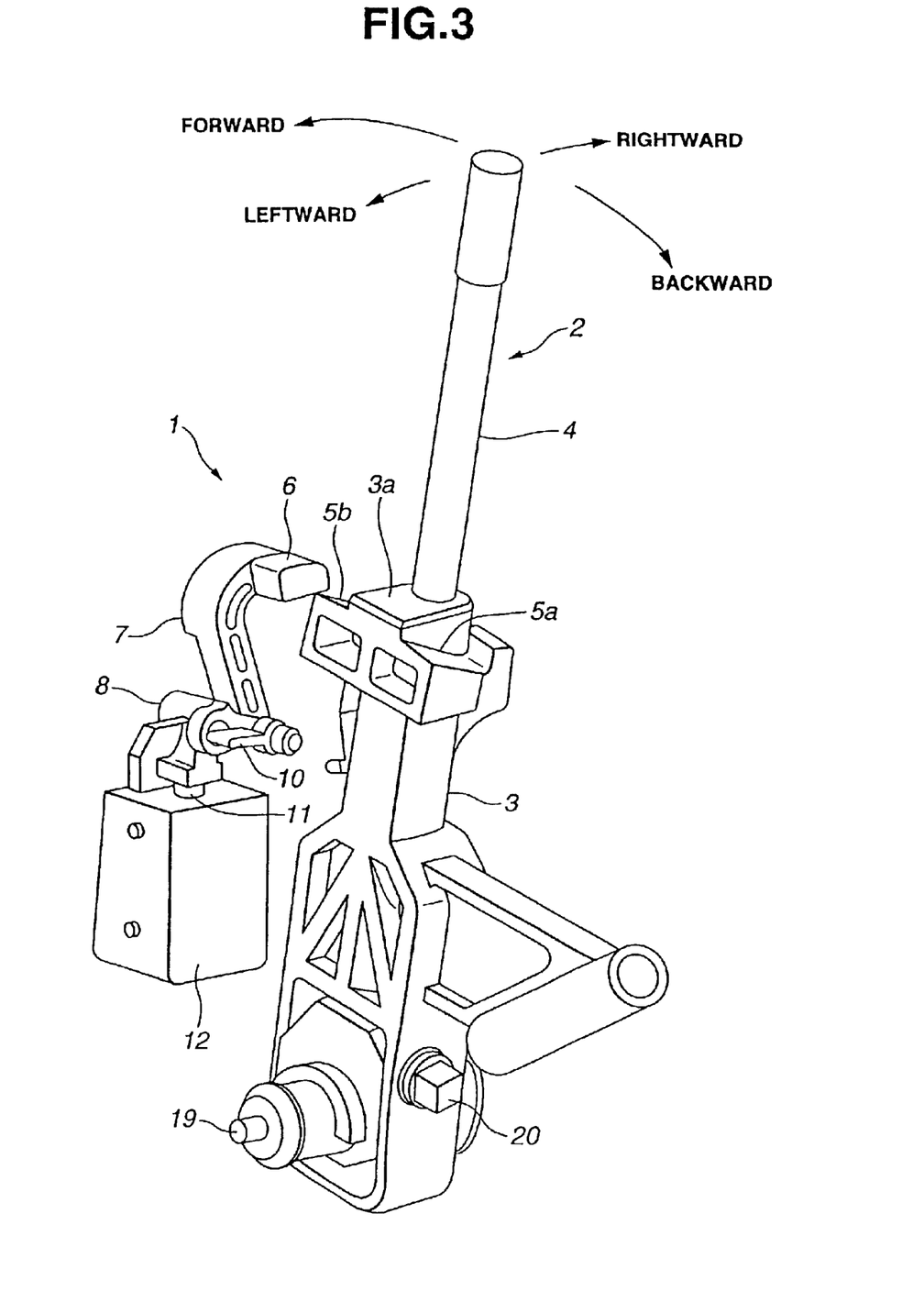
FIG. 3 is an exploded perspective view showing a second embodiment of the present invention.

Referring to FIG. 3, the shift lever 2 includes a pair of abutments 5 formed in the longitudinal direction of the vehicle to have the lever portion 4 therebetween. In this embodiment, an elevated portion 3a is formed between abutting faces 5a, 5b of the abutments 5 to have the lever portion 4 arranged thereon. The elevated portion 3a can be eliminated so that the elevated portion 3a and the abutting faces 5a, 5b are in the same plane. Moreover, in place of including a pair of abutting faces 5a, 5b formed in the longitudinal direction of the vehicle to have the lever portion 4 therebetween, the shift lever 2 can include a single abutting face formed on the side of the shift lever 2.

Figure 5:
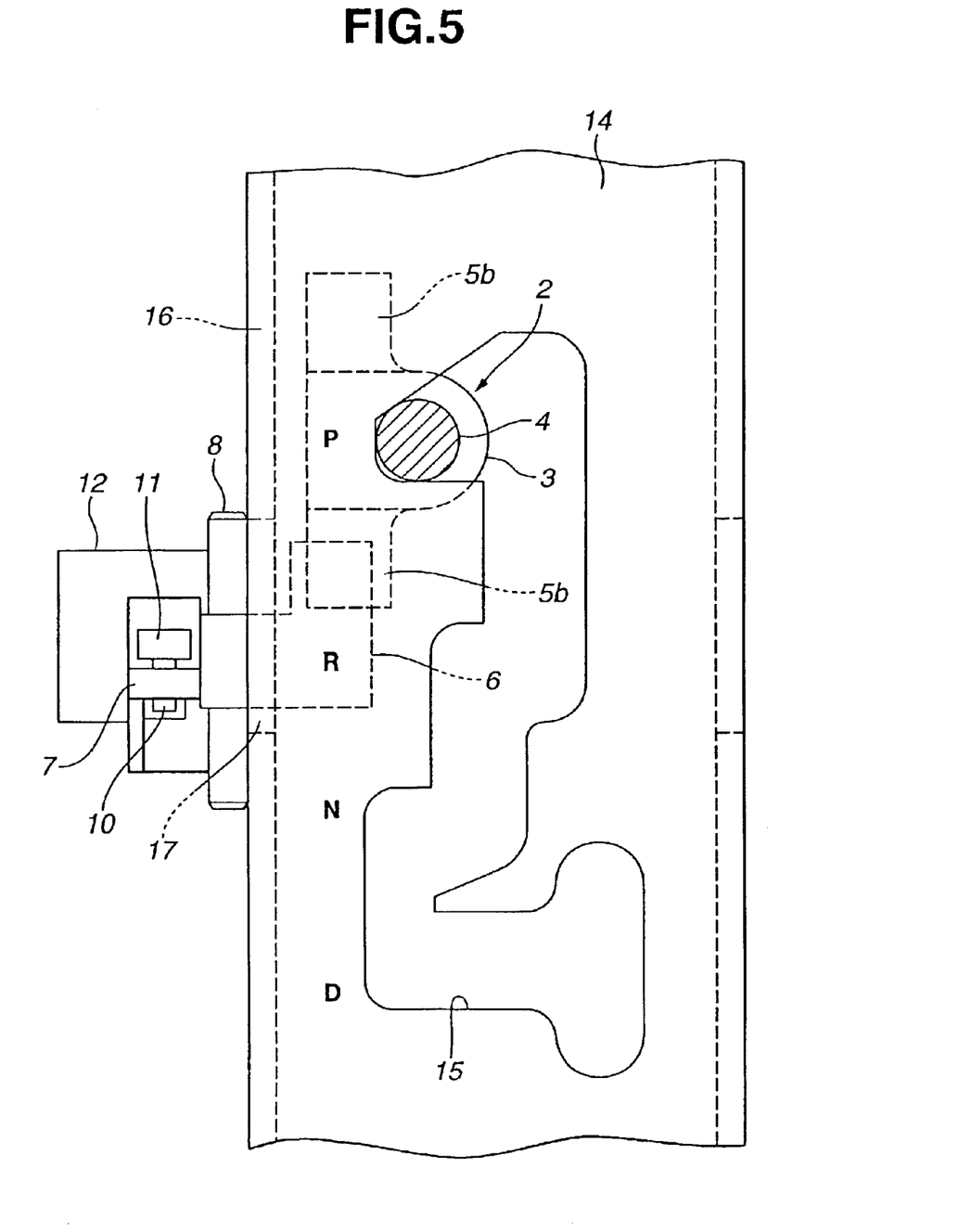
FIG. 5 is an explanatory view for explaining operation of the second embodiment with parking lock being active.

With the shift lock mechanism 1 having such structure, as shown in FIG. 5, the drive part 12 is fixed to the base bracket 14, e.g. on the outer face of the left side wall 16, facing a neighborhood of the R position roughly in the center of the gate groove 14 formed in the upper face of the base bracket 14. Thus, the lock member 7 is supported rotatably so that the hook 6 can move into and out of the base bracket 14 through the window hole 17 of the side wall 16. The lever portion 4 of the shift lever 2 protrudes from the gate groove 15 of the base bracket 14, and the main-body portion 3 of the shift lever 2 is located in the lower portion of the base bracket 14.

FIG. 5 shows a state of parking lock achieved wherein the shift lever 2 is shifted to the P position to rotate the lock member 7 clockwise in FIG. 2 about the shaft 8 through the drive part 12 having the protruding plunger 11, so that the hook 6 is engaged with the abutting face 5a on the front side of the vehicle. Then, when operation such as depressing of a brake pedal is performed for running of the vehicle, the drive part 12 is energized to draw the plunger 11 therein, so that the lock member 7 is rotated outward of the base bracket 14 as shown in FIG. 2, disengaging the hook 6 from the abutting face 5a. Then, after being moved rightward in the gate groove 15, the shift lever 2 can be shifted to the R, N or drive (D) position.

Figure 6:
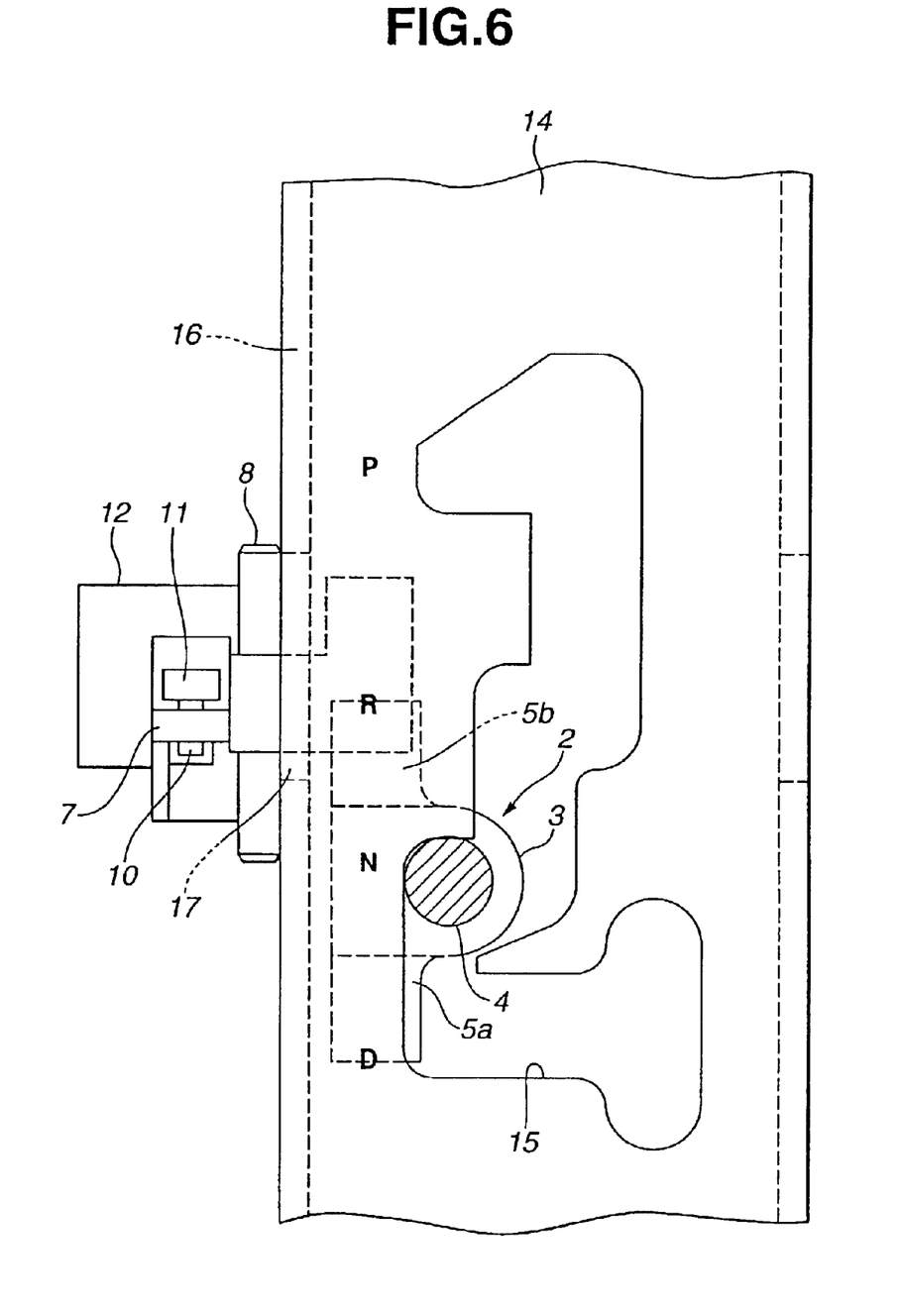
FIG. 6 is a view similar to FIG. 5, showing operation of the second embodiment with neutral lock being active.

FIG. 6 shows a state of neural lock wherein when the shift lever 2 is shifted to the N position in FIG. 5, the plunger 11 of the drive part 12 protrudes to rotate the lock member 7 inward of the base bracket 14 as shown in FIG. 1, so that the hook 6 is engaged with the abutting face 5b on the rear side of the vehicle. In this state, when operation is carried out to shift the shift lever 2 to the D position, engagement of the abutting face 5b with the hook 6 is released, so that the shift lever 2 can be moved from the N position to the D position. However, the shift lever 2 cannot be moved from the N position to the R or P position.

For achieving this, the abutting face 5b includes a face which is inclined downward in the operating direction of the shift lever 2, i.e. rightward in FIG. 5, with respect to a tangent line of a circular arc with the shaft 20 or the center of rotation of the shift lever 2 in the cross direction of the vehicle as center, and is also inclined downward toward the P position, i.e. toward the front of the vehicle, with respect to a tangent line of a circular arc with the shaft 19 or the center of rotation of the shift lever 2 in the longitudinal direction of the vehicle as center.

In this embodiment, parking lock and neutral lock are performed by a pair of abutments 5 and one lock member 7. Optionally, referring to FIG. 4, parking lock and neutral lock may be performed by a pair of lock members 7 and one abutment 5.

Figure 4:
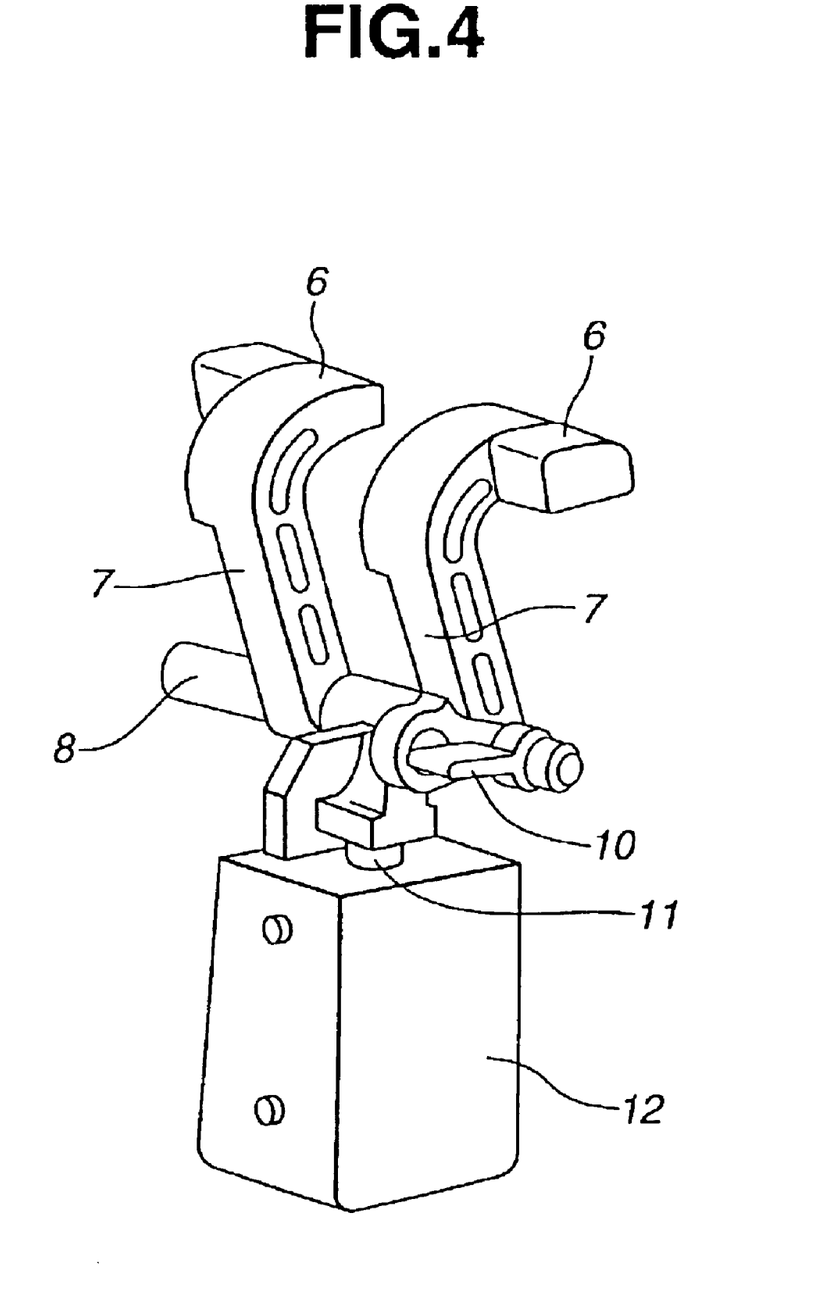
FIG. 4 is a perspective view showing another example of a lock member.

In this variation, the lock members 7 include respective hooks 6 as shown in FIG. 4. This double hook structure allows effective parking lock and neutral lock. The lock members 7 are arranged parallel to each other through the common shaft 8. The slot 9 is formed in only one of the lock members 7, and the plunger 11 of the drive part 12 is coupled thereto by the pin 10 arranged through the slot 9.

Figure 7:
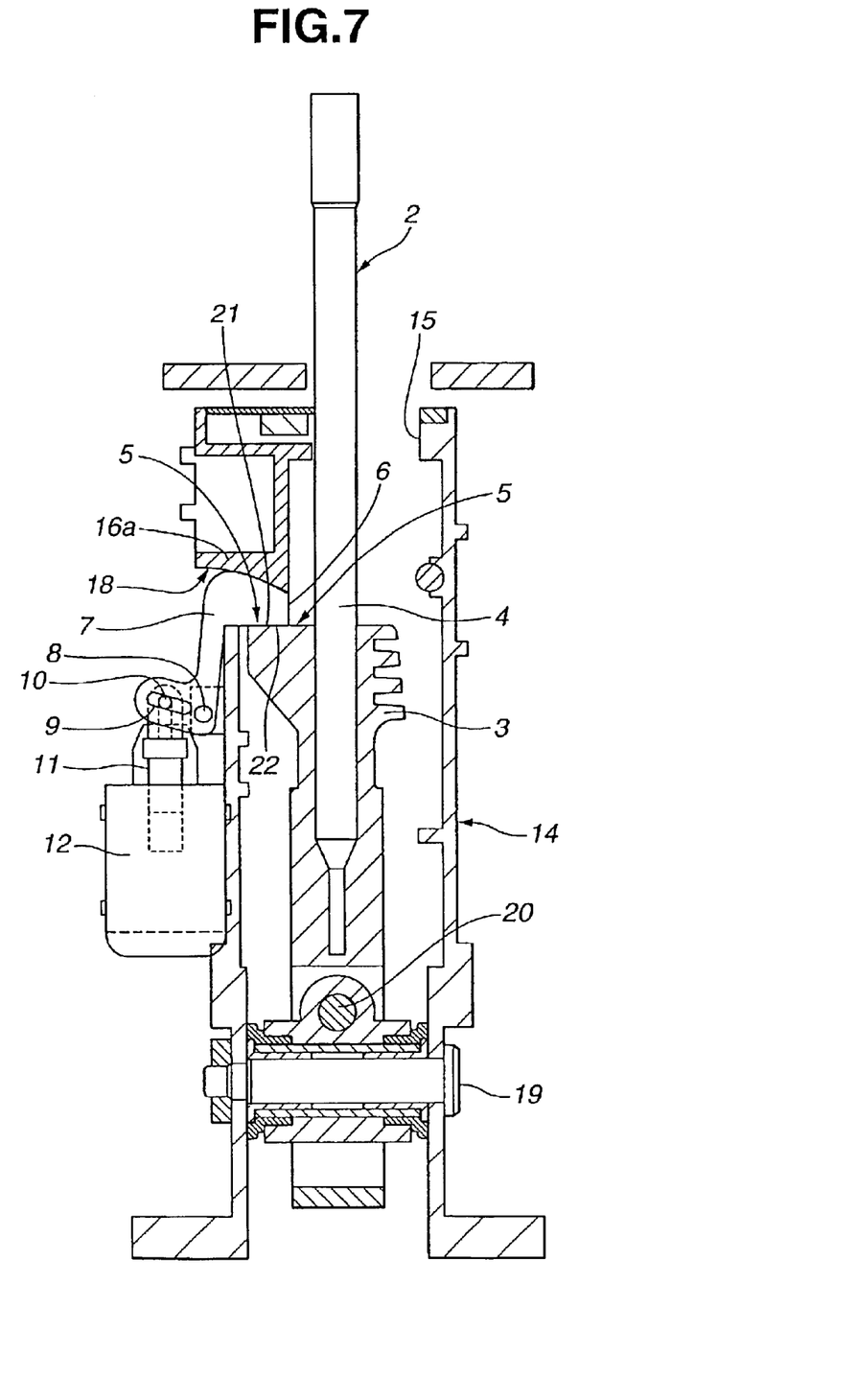
FIG. 7 is a view similar to FIG. 2, showing a variation of the second embodiment with shift lock being active.
Figure 8:
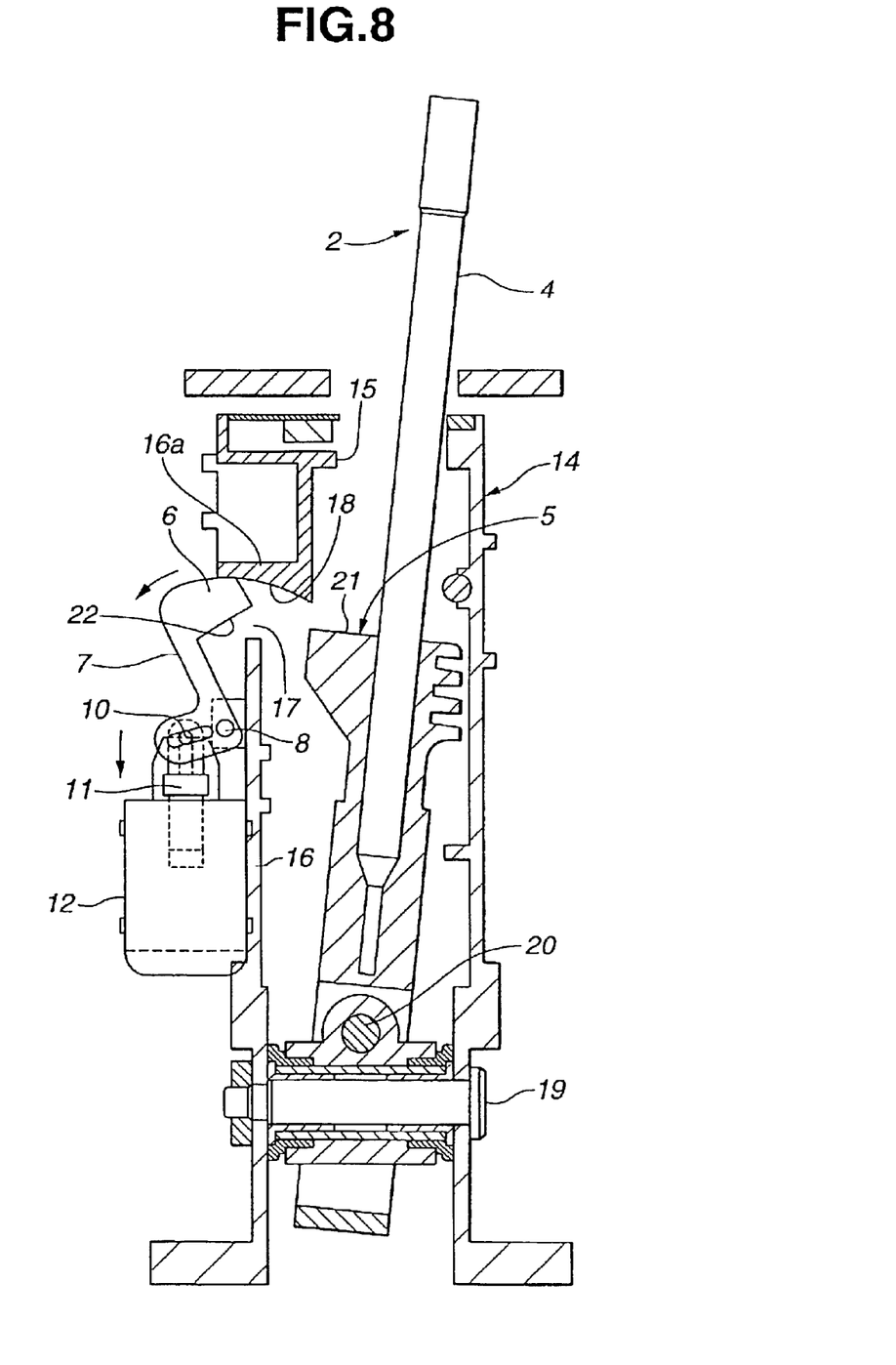
FIG. 8 is a view similar to FIG. 7, showing the variation of the second embodiment with shift lock being released.

Referring to FIGS. 7 and 8, there is shown a variation of the second embodiment. In this variation, the abutment 5 includes a flat face 21 without being inclined as distinct from the second embodiment, and the lower face of the hook 6, which makes contact with the flat face 21, also includes a flat face 22. On the other hand, the abutting face 5b include a face which is horizontal in the cross direction of the vehicle, but inclined toward the front of the vehicle in the longitudinal direction of the vehicle as in the second embodiment. The upper face of the hook 6 includes a circular face as in the second embodiment, and the upper face of the window hole 17 includes circular face 18 having the same curvature as that of the circular face of the hook 6.

In this variation, since the upper faces of the hook 6 and the window hole 17 include circular faces having the same curvature, the hook 6 in its entirety can always make slide contact with the circular face 18. When a force is produced to move the shift lever 2 rightward of the vehicle, the force is input to the receiver 16a of the base bracket 14 via the hook 6 and the circular face 18, achieving less possibility of breakage of the hook 6, etc. Moreover, since engagement of the hook 6 with the abutment 5 is performed by the horizontal flat faces 21, 22 as in the second embodiment, there produces an advantage of preventing movement of the shift lever 2 in the cross direction of the vehicle while allowing movement thereof toward the front of the vehicle.

Figure 9:
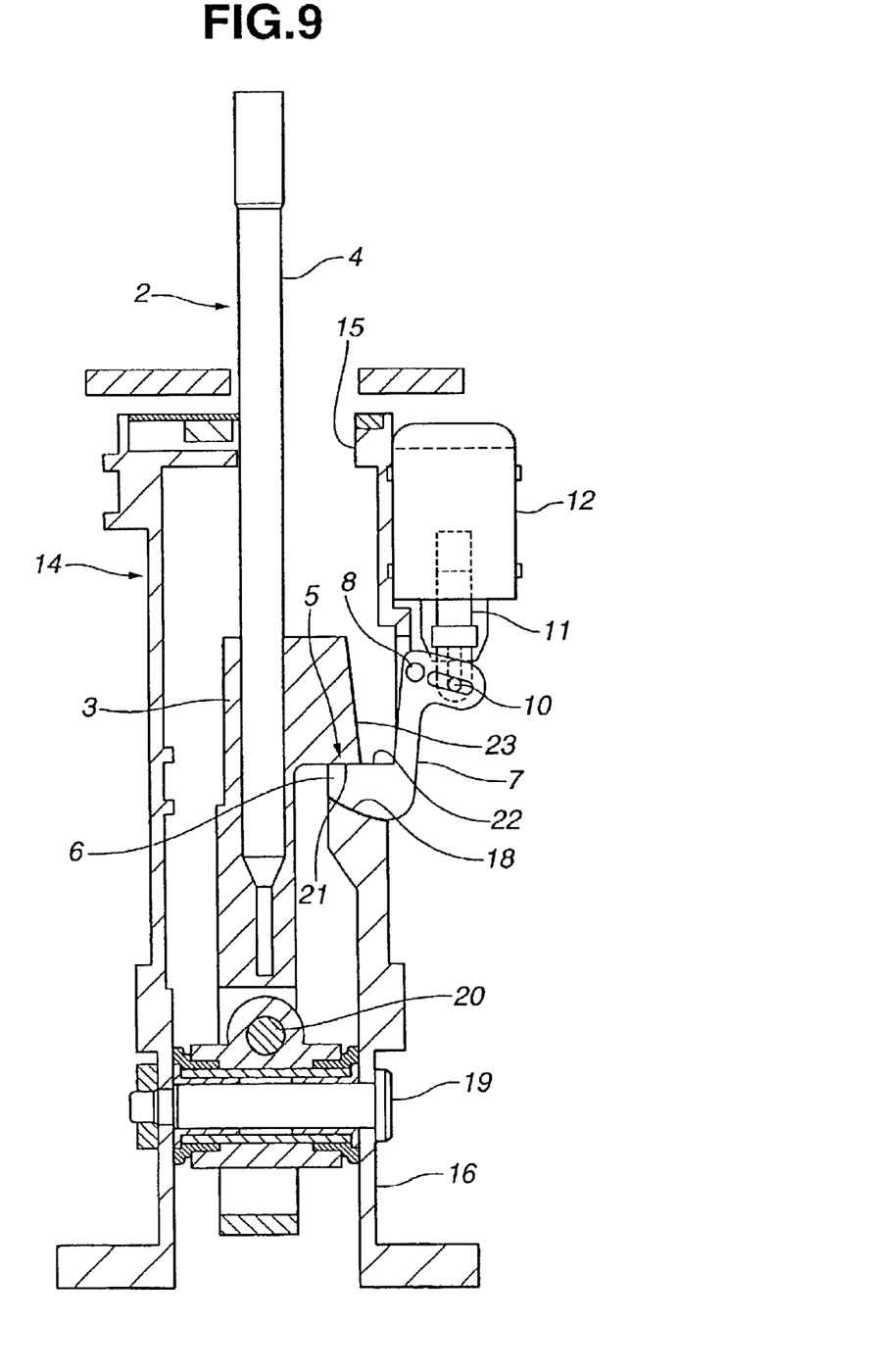
FIG. 9 is a view similar to FIG. 8, showing a third embodiment with shift lock being active.
Figure 10:
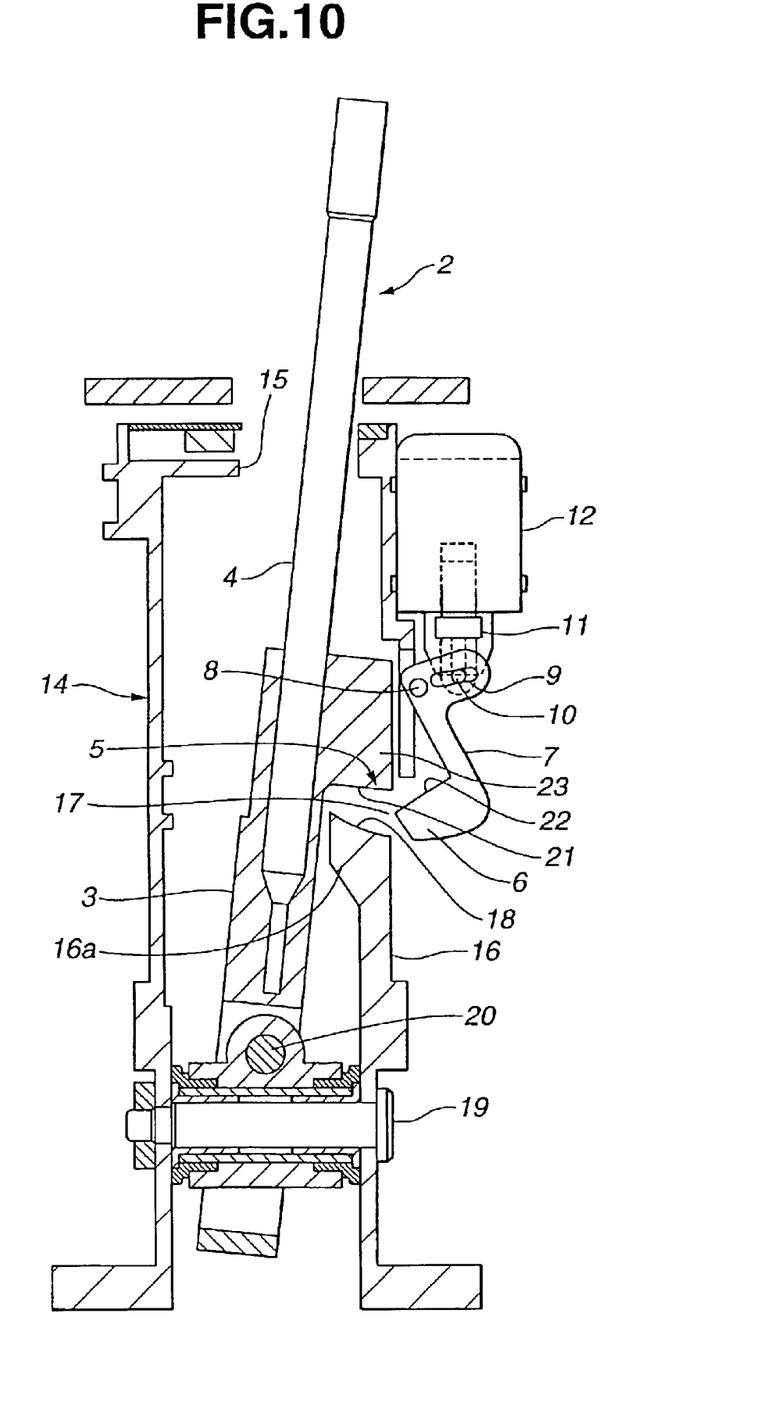
FIG. 10 is a view similar to FIG. 9, showing the third embodiment with shift lock being released.

Referring to FIGS. 9 and 10, there is shown the third embodiment of the present invention. In this embodiment, the drive part 12 and the lock member 7 are mounted to the right side wall 16 of the base bracket 14 at the upper end thereof, which corresponds to the direction of sideward inclination of the shift lever 2. The hook 6 of the lock member 7 is arranged to be able to move into and out of the base bracket 14 through the window hole 17 of the side wall 16. The lower face of the window hole 17 includes circular face 18 having the same curvature as that of the hook 6. The hook 6, which is opposite in arrangement to the above variation, includes flat face 22 and circular face opposite to the circular face 18. The flat face 22 is formed horizontally, and engaged with the lower horizontal flat face 21 of a protrusion 23 formed with the main-body portion 3 of the shift lever 2 on the right side thereof. The circular face 18 is formed with receiver 16a as in the above embodiment.

In the third embodiment, since the upper faces of the hook 6 and the window hole 17 include circular faces having the same curvature, the hook 6 in its entirety can always make slide contact with the circular face 18. When a force is produced to move the shift lever 2 rightward of the vehicle, the force is input to the receiver 16a of the base bracket 14 via the hook 6 and the circular face 18, achieving less possibility of breakage of the hook 6, etc. Moreover, since engagement of the hook 6 with the abutment 5 is performed by the horizontal flat faces 21, 22 as in the above embodiment, there produces an advantage of preventing movement of the shift lever 2 in the cross direction of the vehicle while allowing movement thereof toward the front of the vehicle.

Parking lock and neutral lock in the third embodiment are substantially the same as those described in FIGS. 5 and 6.

In the third embodiment, since movement of the shift lever 2 in the cross direction of the vehicle can be prevented by vertical engagement of the hook 6 of the lock member 7 supported by the outer face of the side wall 16 of the base bracket 14 with the abutment 5 of the main-body portion 3 of the shift lever 2 so as to achieve parking lock and neutral lock, leading to setting of the shift lock mechanism 1 in either of right and left portions of side wall 16 of the base bracket 14 regardless of the shape of the gate groove 15.

In the above embodiments, the drive part 12 and the lock member 6 are directly mounted to the side wall 16 of the base bracket 14. Optionally, they may be mounted to an auxiliary bracket or the like to constitute a shift lock unit, which is then mounted to the side wall 16.

Referring to FIGS. 11–14, there is shown the fourth embodiment of the present invention. In this embodiment, when the shift lever 2 is in parking lock or neutral lock in the first to third embodiments, movement of the shift lever 2 is restrained in the cross and longitudinal directions of the vehicle to prevent the shift lever 2 from being moved to another position.

Figure 11:
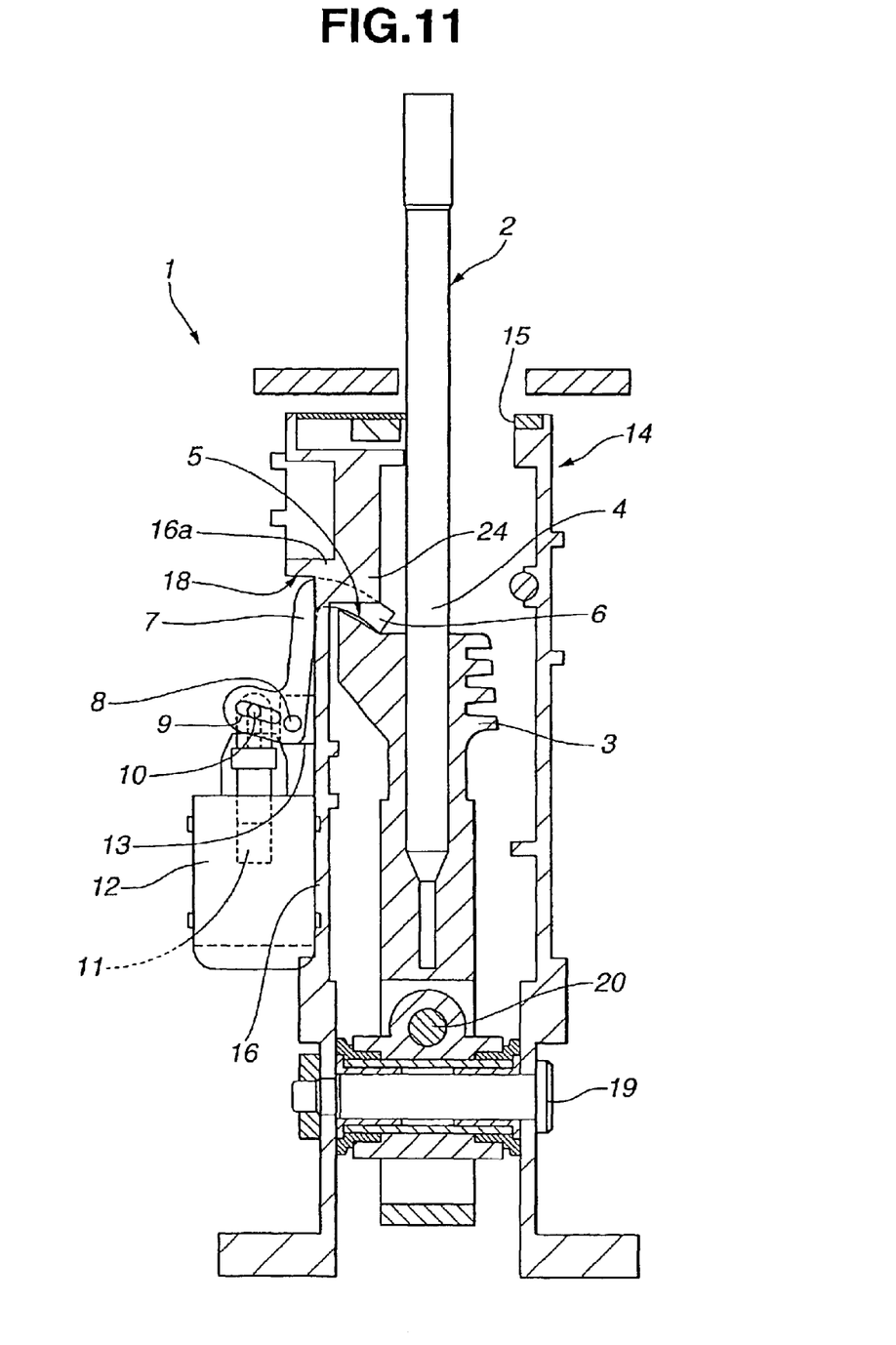
FIG. 11 is a view similar to FIG. 10, showing a fourth embodiment of the present invention with shift lock being active.
Figure 12:
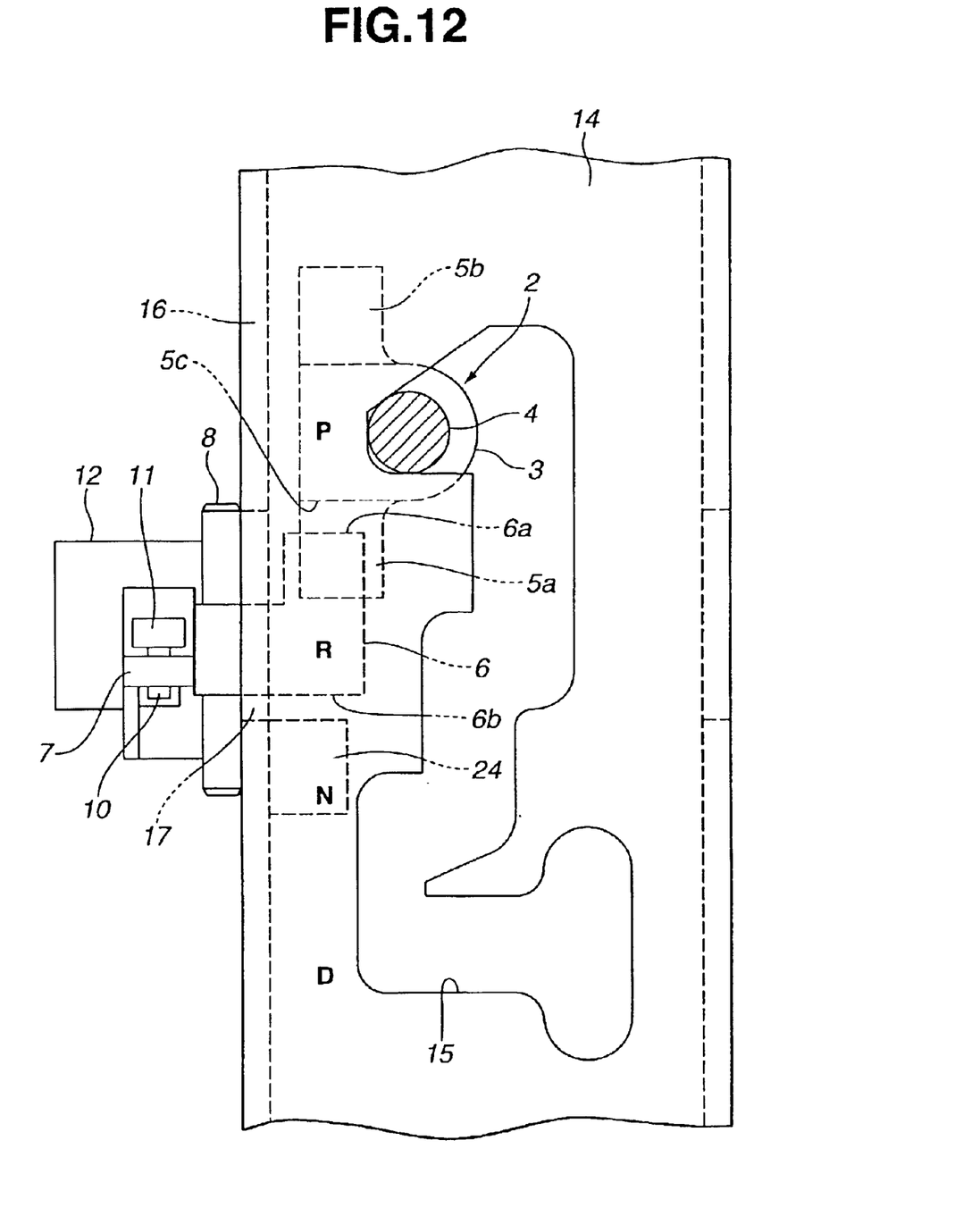
FIG. 12 is a view similar to FIG. 6, for explaining operation of the fourth embodiment with parking lock being active.
Figure 13:
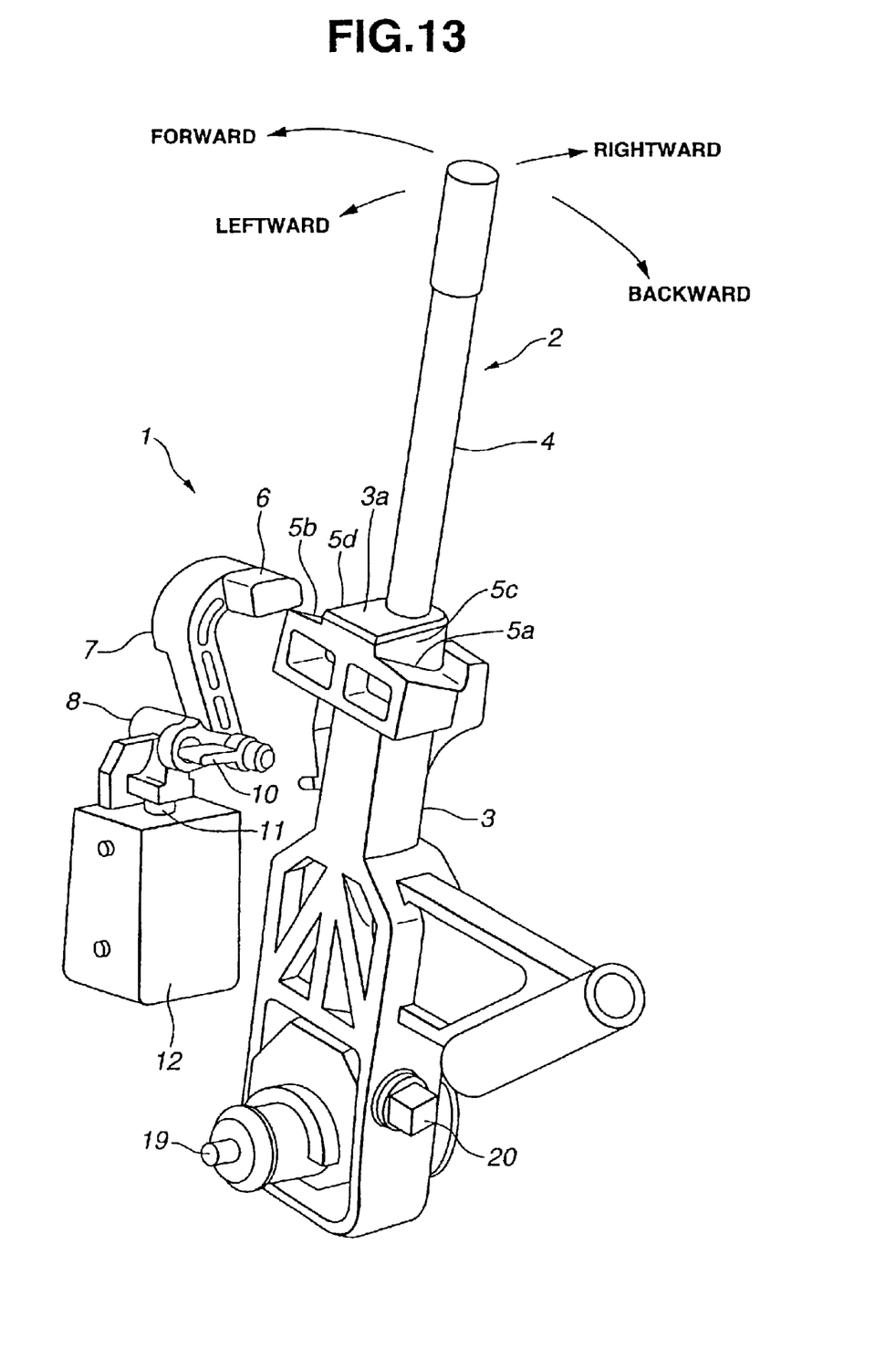
FIG. 13 is a view similar to FIG. 5, showing the fourth embodiment with shift lock being active.
Figure 14:
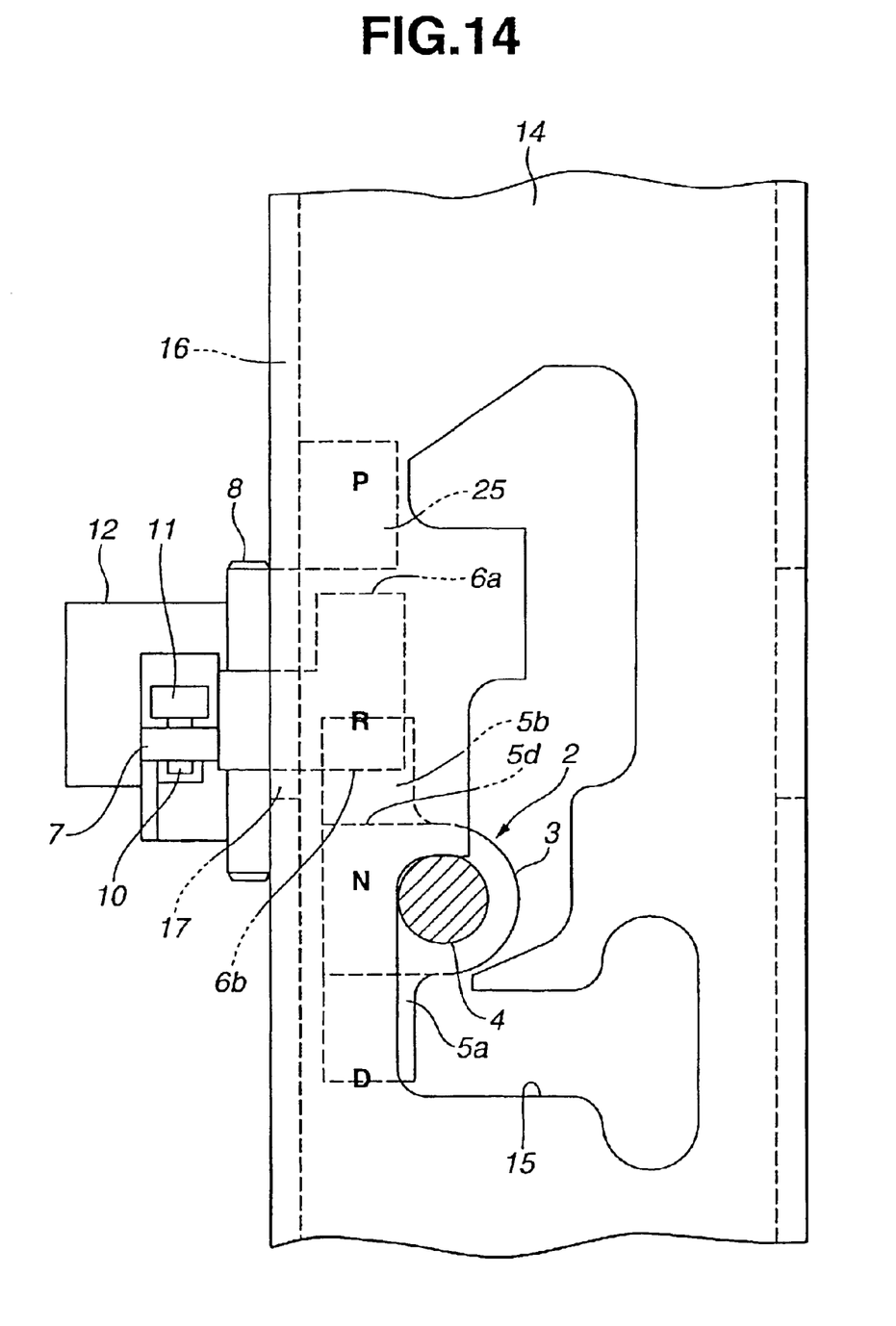
FIG. 14 is a view similar to FIG. 12, for explaining operation of the fourth embodiment.

As shown in FIGS. 11, 12, and 14, overhangs 24, 25 are formed in the neighborhood of the circular face 18 of the window hole 17 of the base bracket 14 in such a way as to protrude from an upper portion of the base bracket 14 downward. As shown in FIG. 13, abutting faces 5c, 5d are formed on the main-body portion 3 of the shift lever 2 on the side of the elevated portion 3a to abut on the lock member 7. In the state of parking lock, the abutting face 5c on the rear side of the vehicle can abut on an end face 6a of the hook 6 of the lock member 7 on the front side of the vehicle.

For neutral lock, the overhang 25 having the same shape as that of the overhang 24 is arranged on the side of the P position as shown in FIG. 14. And as shown in FIG. 13, the abutting face 5d on the front side of the vehicle can abut on an end face 6b of the hook 6 of the lock member 7 on the rear side of the vehicle.

In this embodiment, therefore, when the shift lever 2 is in parking lock or neutral lock, even if an excessive load is applied to the shift lever 2 to forcibly move it to another position, the abutting faces 5c, 5d of the shift lever 2 abut on the end faces 6a, 6b of the hook 6 of the lock member 7 on the front and rear sides of the vehicle, leading to impossible movement of the shift lever 2 in the longitudinal direction of the vehicle in a linear portion of the gate groove 15. However, in the state of neutral lock, the shift lever 2 can be moved to the D position.

In the state of parking lock, the lock member 7 undergoing a load out of the main-body portion 3 of the shift lever 2 has end face 6b abutting on the overhang 24, whereas in the state of neutral lock, it has end face 6a abutting on the overhang 25, thus receiving through the overhangs 24, 25 the load out of the lock member 7. Therefore, even if a load is applied to the lock member 7, the lock member 7 is sufficient in strength, causing no breakage.

Thus, operation for forcibly moving shift lever 2 to another position in the state of parking lock and neutral lock can be prevented with high strength and reliability. In this embodiment, both of parking lock and neutral lock are provided. Optionally, one of parking lock and neutral lock may be provided.

Having described the present invention with regard to the preferred embodiments, it is understood that the present invention is not limited thereto, and various changes and modifications can be made without departing from the scope of the present invention.

The entire teachings of Japanese Patent Application P2002-151947 file May 27, 2002 and Japanese Patent Application P2001-316250 filed Oct. 15, 2001 are incorporated hereby by reference.

What is claimed is:

1. A shift lock mechanism for an automatic-transmission operating device for a motor vehicle, the device including a shift lever which is operable in longitudinal and cross directions of the vehicle, the shift lever including a main-body portion and a lever portion, the mechanism comprising:

a base bracket mounted on a floor of the vehicle, the base bracket including a side wall and a window hole;

a hook formed with the lock member, the hook being able to move into and out of the base bracket through the window hole, the hook comprising a circular face corresponding to a circular path of the lock member with a rotation fulcrum of the lock member as center; and an abutment formed on the shift lever, the abutment being engaged with the hook in a height direction of the base bracket.

2. The shift lock mechanism as claimed in claim 1, wherein the lock member comprises first and second portions connected to each other by a shaft.

3. The shift lock mechanism as claimed in claim 2, wherein the hook comprises first and second portions formed with the first and second portions of the lock member.

4. The shift lock mechanism as claimed in claim 1, wherein the side wall of the base bracket comprises a circular face opposite to the circular face of the hook and having the same curvature as the circular face of the hook.

5. The shift lock mechanism as claimed in claim 1, wherein the abutment is arranged on an upper face of the main-body portion of the shift lever.

6. The shift lock mechanism as claimed in claim 5, wherein the abutment comprises first and second portions having therebetween the lever portion of the shift lever in the longitudinal direction of the vehicle.

7. The shift lock mechanism as claimed in claim 1, further comprising an abutting face formed at an elevated part of the main-body portion of the shift lever, the abutting face being able to abut on the hook.

8. The shift lock mechanism as claimed in claim 1, further comprising an overhang arranged in the neighborhood of the window hole of the base bracket, the overhang being able to abut on the hook.

9. A device for an automatic transmission for a motor vehicle, comprising:

a shift lever being operable in longitudinal and cross directions of the vehicle, the shift lever including a main-body portion and a lever portion;

a base bracket mounted on a floor of the vehicle, the base bracket including a side wall and a window hole;

a lock member rotatably supported to an outer face of the side wall of the base bracket;

a hook formed with the lock member, the hook being able to move into and out of the base bracket through the window hole, the hook comprising a circular face corresponding to a circular path of the lock member with a rotation fulcrum of the lock member as center; and an abutment formed on the shift lever, the abutment being engaged with the hook in a height direction of the base bracket.

10. The device as claimed in claim 9, wherein the lock member comprises first and second portions connected to each other by a shaft.

11. The device as claimed in claim 10, wherein the hook comprises first and second portions formed with the first and second portions of the lock member.

12. The device as claimed in claim 9, wherein the side wall of the base bracket comprises a circular face opposite to the circular face of the hook and having the same curvature as the circular face of the hook.

13. The device as claimed in claim 9, wherein the abutment is arranged on an upper face of the main-body portion of the shift lever.

14. The device as claimed in claim 13, wherein the abutment comprises first and second portions having therebetween the lever portion of the shift lever in the longitudinal direction of the vehicle.

15. The device as claimed in claim 9, further comprising an abutting face formed at an elevated part of the main-body portion of the shift lever, the abutting face being able to abut on the hook.

16. The device as claimed in claim 9, further comprising an overhang arranged in the neighborhood of the window hole of the base bracket, the overhang being able to abut on the hook.

* * * * *